3,796,637
Patented Mar. 12, 1974

3,796,637
**COMPOSITIONS FOR THE REMOVAL OF HYDRO-
CARBON AND INDUSTRIAL WASTE BY BIO-
LOGICAL DEGRADATION**
Pierre Fusey, Paris, France, assignor to Banque pour
L'Expansion Industrielle "Banexi," Paris, France
No Drawing. Filed Feb. 7, 1972, Ser. No. 224,283
Claims priority, application France, Feb. 19, 1971,
7105772
Int. Cl. C12k 1/10
U.S. Cl. 195—100                     8 Claims

ABSTRACT OF THE DISCLOSURE

The invention relates to compositions for the removal of pollutant industrial wastes, in particular hydrocarbon wastes.

In order to promote the biological degradation of waste materials, whilst avoiding foulsmelling anaerobic fermentation, the compositions used contain from 10 to 40% by weight of an oxygenating compound such as a metal oxide or an alkali metal peroxide. The "support," for example calcium carbonate, silica or talc, is chosen depending on the pH of the waste material to be treated. Others materials may be added to the compositions so obtained, namely nutrient substances promoting the gorwth of microorganisms, nitrogenous substances and/or oleophilic substances in the case of compositions for the treatment of hydrocarbons.

---

This invention is concerned with various compositions for absorbing pollutant wastes and for promoting their biological degradation whilst avoiding nauseating or foulsmelling fermentation thereof.

Much research has been carried out into the removal of pollutant industrial wastes, in particular hydrocarbon wastes.

Various methods and compositions have been proposed for waste removal but all of these possess certain disadvantages. Thus, it has been proposed to use dispersing agents or emulsifying agents to deal with hydrocarbon wastes but the use of these may lead to marked imbalance in the biological equilibrium of the particular environment treated. Further, it has been proposed to use weighting agents to precipitate hydrocarbons to the bottom of a body of water to produce agglomerates but these are only very slowly destroyed by the action of microorganisms which may liberate substances which are toxic towards various flora and fauna.

In order to promote the biological degradation of waste materials and in order to minimize the disadvantages inherent in previously proposed compositions, the present invention involves the use of compositions containing from 10 to 40% by weight of a metal oxide and/or alkali metal peroxide.

The metal oxide may be iron oxide, manganese dioxide or zinc oxide.

The presence of oxygen in the compositions, due to the presence of the metal oxide and/or peroxide, leads to aerobic fermentation which is generally more favorable for biological degradation and which is free from nauseating odors.

The oxygenating compound, i.e. the metal oxide and/or peroxide, is formed into the composition by simply mixing it with a support, the nature of which will depend upon the pH of the waste material which it is desired to treat.

In the case of compositions for treating acidic waste materials, the oxygen containing compound is mixed with natural or precipitated calcium carbonate. For the treatment of basic waste materials, the support comprises an acid salt, for example the acid metalsilicate of magnesium or talc. Finally, in the case of the treatment of neutral waste materials, or where for some reason or other, it is preferred not to alter the initial pH of the waste material, a neutral support is used, such as natural silica or infusorial earth.

When it is desired to treat liquid waste materials, the compositions have the interest to be absorbent due to the nature of the support.

In the treatment of hydrocarbon wastes, absorbtion may be promoted by the addition of some 5 to 15% by weight of an oleophilic substance such as a fatty acid (e.g. stearic acid, palmitic acid, adipic acid or oleic acid).

Further, in order to promote the biological degradation process, the compositions may also contain from 10 to 30% by weight of a nutrient substance which may contain both gross nutrients and trace elements. Examples of suitable nutrients substances include, for example, maize liquor, malting wastes or residues, or molases.

Finally, in order to promote degradation when treating hydrocarbon wastes, the composition advantageously contains from 2 to 10% by weight of imino, amino, or ammonium nitrogen, i.e. nitrogen in the form ($NH$, $NH_2$ or $NH_4$). This nitrogen may be intoduced into the composition, for example, by the addition of urea, ammonium phosphate, ammonium nitrate, or ammonium sulphate.

The following compositions are given by way of example and are not intended to limit the invention.

Compositions for the treatment of acidic wastes

| (1) | kg. |
|---|---|
| Natural calcium carbonate | About 70 |
| Natural iron oxide | About 70 |
| (2) | |
| Precipitated calcium carbonate | About 80 |
| Zinc oxide | About 20 |
| (3) | |
| Precipitated calcium carbonate | About 75 |
| Manganese dioxide | About 25 |
| (4) | |
| Natural calcium carbonate | About 80 |
| Sodium perborate | About 20 |

Compositions for the treatment of basic wastes

| (5) | kg. |
|---|---|
| Talc | About 75 |
| Sodium peroxide | About 25 |
| (6) | |
| Talc | About 80 |
| Zinc oxide | About 20 |
| (7) | |
| Talc | About 75 |
| Manganese dioxide | About 25 |
| (8) | |
| Talc | About 75 |
| Potassium peroxide | About 25 |

(9–16) The compositions obtained by replacing the calcium carbonate or talc in the compositions of Examples 1–8 by natural silica.

As stated above, all these compositions may also contain from 10 to 30% by weight of nutrient substances and/or, for the treatment of hydrocarbon wastes, from 1 to 5% by weight of an oleophilic substance.

The following examples illustrate the use of such compositions:

EXAMPLE A 50 litres of waste water from a paper mill were treated with 10 kilograms of the following mixture:

| | Parts by weight |
|---|---|
| Talc | 65 |
| Manganese dioxide | 25 |
| Maize liquor | 10 |

At the end of 30 days, the degradation of the waste was complete without the development of any nauseating fermentation.

EXAMPLE B 100 grams of crude petroleum floating on the surface of 10 litres of sea water in a vessel were absorbed and precipitated by the addition of 100 grams of the following composition:

| | Parts by weight |
|---|---|
| Precipitated calcium carbonate | 60 |
| Zinc oxide | 15 |
| Malt extract | 10 |
| Stearic acid | 5 |
| Ammonium phosphate | 10 |

After 10 days, there was no longer any hydrocarbon odor nor did any nauseating odor develop.

EXAMPLE C 500 grams of light fuel oil spread over a cement floor were absorbed with 500 grams of the following mixture:

| | Parts by weight |
|---|---|
| Infusorial earth | 50 |
| Manganese dioxide | 25 |
| Molasses | 10 |
| Urea | 5 |
| Stearic acid | 10 |

The fuel oil was completely absorbed and the floor could be cleaned simply by sweeping. The fuel oil/composition mixture was taken up and poured into 20 litres of soft water. After 12 days there was no longer any fuel oil odor nor did any nauseating fermentation develop.

I claim:

1. A composition for the biological removal of waste materials, comprising an absorbing mineral substance selected from the group consisting of calcium carbonate, magnesium acid metasilicate, natural silica, infusorial earth and talc, and 10 to 40% by weight of an oxygenating compound selected from the group consisting of metal oxide and alkali metal peroxide.

2. A composition as claimed in claim 1, containing 2 to 10% by weight of a member selected from the group consisting of urea, ammonium phosphate, ammonium nitrate and ammonium sulphate.

3. A composition as claimed in claim 1, containing 5 to 15% by weight of a fatty acid.

4. A composition as claimed in claim 1, containing 10 to 30% by weight of a nutrient substance for promoting the growth of microorganisms.

5. A composition as claimed in claim 4, in which said nutrient substance is selected from the group consisting of maize liquor, malting wastes, malting residues and molasses.

6. A composition as claimed in claim 4, containing 5 to 15% by weight of a fatty acid.

7. A composition as claimed in claim 4, containing 2 to 10% by weight of a member selected from the group consisting of urea, ammonium phosphate, ammonium nitrate and ammonium sulphate.

8. A composition as claimed in claim 7, containing 5 to 15% by weight of a fatty acid.

References Cited

UNITED STATES PATENTS

| | | | |
|---|---|---|---|
| 3,715,322 | 2/1973 | Kobayashi et al. | 252—471 |
| 3,702,875 | 11/1972 | Manning et al. | 252—471 |
| 2,165,428 | 7/1939 | Waugh | 252—471 |

A. LOUIS MONACELL, Primary Examiner

R. JAMES WARDEN, Assistant Examiner

U.S. Cl. X.R.

252—461